(12) United States Patent
Arai et al.

(10) Patent No.: US 8,300,503 B2
(45) Date of Patent: Oct. 30, 2012

(54) THERMALLY-ASSISTED MAGNETIC RECORDING HEAD

(75) Inventors: Satoshi Arai, Yokohama (JP); Naoki Matsushima, Chiba (JP); Irizo Naniwa, Fujisawa (JP); Junichiro Shimizu, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/997,201

(22) PCT Filed: Jun. 3, 2009

(86) PCT No.: PCT/JP2009/060171
§ 371 (c)(1),
(2), (4) Date: Jan. 13, 2011

(87) PCT Pub. No.: WO2009/150981
PCT Pub. Date: Dec. 17, 2009

(65) Prior Publication Data
US 2011/0141862 A1    Jun. 16, 2011

(30) Foreign Application Priority Data

Jun. 10, 2008   (JP) ................................ 2008-151223

(51) Int. Cl.
*G11B 11/10*    (2006.01)
(52) U.S. Cl. .................... 369/13.32; 369/13.33; 369/300
(58) Field of Classification Search ............... 369/13.24, 369/13.33
See application file for complete search history.

(56) References Cited

U.S. PATENT DOCUMENTS

| 6,404,706 B1 * | 6/2002 | Stovall et al. ............... 369/13.17 |
| 2005/0018547 A1 | 1/2005 | Akiyama et al. |
| 2006/0187564 A1 | 8/2006 | Sato et al. |

FOREIGN PATENT DOCUMENTS

| JP | 2001-319365 A | 11/2001 |
| JP | 2002-298302 A | 10/2002 |
| JP | 2006-185548 A | 7/2006 |
| JP | 2007-95167 A | 4/2007 |
| JP | 2007-335027 A | 12/2007 |
| JP | 2008-59645 A | 3/2008 |
| JP | 2009-4030 A | 1/2009 |

OTHER PUBLICATIONS

International Search Report dated Jul. 14, 2009 with English translation (Four (4) pages).

* cited by examiner

*Primary Examiner* — Wayne Young
*Assistant Examiner* — Brian Butcher
(74) *Attorney, Agent, or Firm* — Crowell & Moring LLP

(57) ABSTRACT

In a thermally assisted magnetic recording head having a light source and a waveguide to lead a laser beam radiated from the light source to a front end of the magnetic head, while blocking an adverse effect of heat generated in the light source and securing a good floating characteristic, the light source and the magnetic head are optically coupled with high efficiency and the magnetic head itself is reduced in size. This invention provides a reflection mirror that is formed of a part or whole of one inclined end surface of the semiconductor laser mounted on the first submount. Near one end surface of the slider is provided the optical waveguide that pierces through the slider in a direction of the thickness thereof. The slider is mounted on the second submount and the positions of the first submount and the second submount are adjusted to practically align the light axis of the beam emitted from the mirror with the light axis of the optical waveguide, thereby realizing a novel thermally assisted magnetic recording head.

10 Claims, 6 Drawing Sheets

THERMALLY-ASSISTED MAGNETIC RECORDING HEAD

INCORPORATION BY REFERENCE

This application claims the priority benefit of Japanese Patent Application No. 2008-151223, filed on Jun. 10, 2008, the entire descriptions of which are incorporated herein by reference.

TECHNICAL FIELD

The present invention relates to a thermally assisted magnetic recording head comprising a magnetic recording medium, a means to write in the recording medium by a magnetic field and a means to heat the recording medium with a laser beam.

BACKGROUND ART

With the development of information society in recent years, voice and video have progressed in the level of resolution and the volume of data traffic in the Internet has also increased significantly. This in turn has resulted in an increase in electronic data volume accumulated in servers and the like, making it necessary to expand the capacity of information recording systems. Optical disc drives and hard disk drives installed as information recording devices in personal computers, recorders and cameras are being called upon to have higher recording densities to accumulate huge volumes of information. The higher recording density represents a further miniaturization of a recording bit size in the disks.

To realize an increased recording density of hard disks requires narrowing a distance between the recording medium and a head and miniaturizing the diameters of crystal grains of a magnetic film on the magnetic recording medium. The magnetic recording medium has a problem of heat fluctuation in which as the crystal grains are miniaturized in diameter, the grains become thermally unstable. This problem has come to be known in recent years as a major inhibiting factor for higher recording density. For realizing both the miniaturized crystal grains and the heat stability at the same time, it is effective to increase a coercive force. The increased coercive force in turn requires increasing the magnetic field strength of the head in performing the recording. However, since there is a limit to the property of a magnetic material used in the recording head and to the reduction in the distance between the magnetic disk and the head, it is difficult to increase the coercive force as the recording density is enhanced. To solve this problem, a optical-magnetic hybrid recording technique has been proposed that combines the optical recording and the magnetic recording. The coercive force of a medium is reduced during recording by heating the medium at the same time that an applied magnetic field is generated. This makes it possible to easily record a medium even with a high coercive force which it has been difficult for the conventional magnetic head to record because of an insufficient recording magnetic field strength. A playback operation utilizes a magnetoresistive effect that has been used in the conventional magnetic recording. This hybrid recording method is called a thermally assisted magnetic recording. Here, as a heating method based on light, a method using a near field is proposed. The thermally assisted magnetic recording based on the near field introduces a laser beam from a laser beam source and changes a beam spot diameter to an appropriate size for recording by using a device having a function to generate a near field light (hereinafter referred to as a near field light generating device) before using the spot for recording.

For the laser beam source, a small, low power consumption semiconductor laser (also referred to as a laser diode) is normally used because it must be used in a package of a disc drive. For applications in a thermally assisted magnetic recording drive using a near field that realizes a recording density of more than $Tb/in^2$ (terabytes/square inch), a power of around several mW is required for the light beam to reach the recording medium surface.

Optical parts that introduce a laser beam generated by the laser diode (hereinafter referred to as an LD) to the near field generating device include a reflection mirror, a lens and an optical waveguide. The beam from the LD passes through optical parts installed in a light path to arrive at the near field generating device and a recording medium beyond it. The light intensity of the beam, as it passes through the light path, becomes several tens of times smaller than its original light power produced by the LD. Major causes for the light intensity attenuation include absorption loss and scattering loss that occur as the beam passes through the optical parts, and a connection loss resulting from deviations of optical parts from their ideal positions when they are bonded together. So, in the thermally assisted magnetic recording, it is essential to achieve a construction that reduces the connection loss up to the beam entering the near field generating device.

A slider in the hard disk drives, on the other hand, has progressed in quest of its size reduction from a picoslider to a femtoslider. The air bearing surface has been lowered down to a floating distance of about 10 nm. As the miniaturization advances further, the floating distance is expected to be reduced. However, as the miniaturization and the floating distance reduction make a progress, a warping of the slider itself poses a problem. For this reason, a construction needs to be developed which suppresses the warping of the slider and at the same time reduces the connection loss described above.

JP-A-2002-298302 (hereinafter referred to as a patent document 1) provides an optically assisted magnetic recording head that achieves a reduced noise in medium, the securing of a thermal agitation resistance and the recording by a practical recording head, in a construction that has an optical fiber arranged over the slider formed with a groove and introduces a laser beam through an optical prism at the end face of the slider into a near field probe and a write head, a paired structure facing the optical fiber with a gap in between. In JP-A2006-185548 (referred to as a patent document 2) a thermally assisted magnetic recording head is provided in which a slider, magnetic poles, a magnetic recording device, a magnetic playback device, a light waveguide and an opening are provided beneath a suspension, with a laser diode arranged on the opposite side of the suspension, to reduce the size and weight of the recording head. The patent document 2 also describes a construction in which the waveguide and the LD element are longitudinally arrayed in the same direction as the slider. JP-A-2007-95167 (referred to as a patent document 3) provides a thermally assisted magnetic recording head in which a semiconductor laser, a waveguide, a near field generating device and a diffractive device that functions as a slider are arranged on a suspension so that a laser beam propagates through the waveguide and is gathered by the diffractive device to illuminate a plasmon probe, thus achieving a reduced thickness with a simple construction.

PRIOR ART DOCUMENT

Patent Document

Patent document 1: JP-A-2002-298302
Patent document 2: JP-A-2006-185548
Patent document 3: JP-A-2007-95167

SUMMARY OF INVENTION

Problem to be Solved by the Invention

In the prior art discussed in the above patent document 1, a light is led to the slider end through an optical fiber. Although there is no suggest as to the location where the laser light source and the optical fiber are secured, if they are mounted to the suspension or arm, laying the optical fiber up to the slider poses a big problem. In addition, the optical fiber has high stiffness and thus tends to hinder the movement of the slider as it floats according to the warping of a disk. So, this construction poses many problems with the floating characteristics.

With the prior art discussed in the above patent document 2, since the light is introduced to the waveguide through the thickness of the suspension or the thickness of a connecting material with the suspension, there is a problem of poor light coupling efficiency. Further, while the slider generally makes a fine movement on a dimple, the above construction does not allow the LD light to follow the slider movement, giving rise to a serious problem with optical coupling. If, on the other hand, the submount is provided on the slider side, the problem of following to the slider movement is solved. However, since the LD needs to have a length (length of oscillator) of about 500 μm, the slider becomes thick, raising a serious problem of size. In addition, there is no suggestion as to heat dissipation from the LD element and connecting materials between the suspension and the slider and between the slider and the submount. With the prior art discussed in the above patent document 3, a waveguide is mounted on the suspension, with the slider connected to the suspension. This construction, however, has no provision for moving the slider in response to warping and bending, as is done by the conventional dimple, raising many problems in terms of the floating characteristic. Further, this patent document proposes a light transmitting flat plate of resin or quartz for the slider, but it is difficult to replace the AlTiC, that has been used so far, with the proposed material, considering machining precision, stiffness and cost.

It is therefore an object of this invention to provide a thermally assisted magnetic recording head that propagates with high efficiency a beam from the semiconductor laser to the optical waveguide near the magnetic head while securing a desired heat dissipation and a floating characteristic, thereby achieving a high-density, high-speed recording capability.

Means to Solve the Problem

To achieve the above objective, the present invention provides a thermally assisted magnetic recording head, in which a semiconductor laser mounted on a first submount has a reflection mirror that has at least a part or whole of one end surface thereof formed as an inclined surface; in which an optical waveguide is installed to extend through the slider in a direction of the slider thickness; in which the slider is mounted on a U-shaped second submount or on a second submount formed of a plurality of combined, rectangular parallelepiped submounts; and in which the first submount and the second submount are arranged so that a light axis of the beam from the mirror and a light axis of the optical waveguide are almost aligned.

A representative example is:

(1) a thermally assisted magnetic recording head comprising: "a semiconductor laser having a mirror at one end thereof in an oscillator direction (in a z-axis direction described later), the mirror being adapted to reflect a laser beam in a direction crossing the oscillator direction (in a y-axis direction described later)"; "a slider having a pair of magnetic poles at one end thereof (to generate a magnetic field to be applied to a recording medium) and a waveguide formed on the one end side, the waveguide being optically coupled to one end of the semiconductor laser"; "a first submount mounting the semiconductor laser and having a main surface extending in the oscillator direction of the semiconductor laser"; and "a second submount having on opposite sides thereof a first main surface and a second main surface (facing a suspension described later) and having the slider secured to a part of a first end side of the first main surface;

wherein the other part of the first main surface on a second end side opposite the first end and a part of the second main surface opposing the other part extend in a pair of separate portions from the second end toward the part (practically in the oscillator direction) and are U-shaped (in a x-z plane described later);

wherein the first submount is joined, on both sides of a portion of the main surface thereof where the semiconductor laser is mounted, to the pair of separate portions forming the other part of the first main surface of the second submount so that the semiconductor laser mounted on the main surface of the first submount is sandwiched between the pair of separate portions forming the U-shaped other part of the first main surface of the second submount;

wherein the one end of the semiconductor laser and the waveguide formed in the slider are optically coupled in a space enclosed by the main surface of the first submount, the part of the first main surface of the second submount and the pair of separate portions forming the other part.

In this example:

(2) the second submount may comprise at least three parts, the three parts being a first member forming the part of the first main surface, and a second member and a third member both forming the pair of separate portions of the other part of the first main surface; or (3) the semiconductor laser and the waveguide may be optically coupled by having opposed to each other the one end of the semiconductor laser, which protrudes from an end of the main surface of the first submount toward the part of the main surface of the second submount, and one end of the waveguide, which protrudes from the part of the main surface of the second submount toward the second end of the main surface.

This invention is characterized in that a near field generating device is arranged at the floating surface end of the optical waveguide and at a portion near the floating surface end. For example:

(4) at the other end of the waveguide formed in the slider, which is opposite the one end thereof where the waveguide is optically coupled with the semiconductor laser, there is provided a near field generating device that generates a near field light from the laser beam transmitted through the waveguide.

This invention is also characterized in that both of the p-type electrode and the n-type electrode of the semiconductor laser element are provided on the surface on the active layer side. For example:

(5) the semiconductor laser has a semiconductor substrate and an active layer formed on one side of a main surface of the semiconductor substrate, and a p-type electrode and an n-type electrode for injecting current into the active layer are provided on the active layer side of the main surface of the semiconductor substrate.

Further, this invention is characterized in that the semiconductor laser element has an alignment marking formed in the process of building a mesa structure and that the slider has an alignment marking formed in the process of making the core. For example:

(6) the semiconductor laser is formed with an alignment marking in a process of forming the active layer in a mesa structure and the slider is formed with an alignment marking in a process of forming a core of the waveguide at the one end thereof.

Another feature of this invention is that the width of the second submount is greater than that of the slider. For example:

(7) the width of the second submount (dimension in an x-axis direction described later) crossing a direction extending from the first end of the first main surface to the second end (the oscillator direction or a z-axis direction described later) is larger than a width of the slider crossing a longitudinal direction thereof.

Still another feature of this invention is that the width of the second submount is greater than that of the first submount. For example:

(8) the width of the second submount crossing the longitudinal direction thereof is larger than a width of the first submount crossing a longitudinal direction thereof.

A further feature of this invention is that, at least a part of the end portions of the second submount and the slider, fillets are formed using a heat dissipating material or an adhesive with high heat conductivity. For example:

(9) at least a part of ends of the first main surface of the second submount and of the slider in contact with the first main surface of the second submount, a heat dissipating material or a fillet of a bonding agent with higher heat conductivity than that of a bonding agent used to bond the second submount and the slider is formed.

A further feature of this invention is that a heat dissipating material or an adhesive with high heat conductivity is filled in a part of a gap between the first submount and the slider. For example:

(10) a heat dissipating material or a bonding agent with higher heat conductivity than that of the bonding agent used to bond the second submount and the slider is filled into at least a part of a gap between the first submount and the slider.

A further feature of this invention is that the elastic modulus or hardness of the heat dissipating material and the adhesive with high heat conductivity are smaller than those of the adhesive joining the second submount to the slider and the first submount. For example:

(11) an elastic modulus and a hardness of the heat dissipating material and the bonding agent with high heat conductivity are smaller than those of the bonding agent that bonds the second submount to the first submount and the slider.

A further feature of this invention is that a resin with a refractive index of more than unity is filled where a light reflected by the reflection mirror couples with the waveguide. For example:

(12) between the one end of the semiconductor laser protruding from the main surface of the first submount and the one end of the waveguide protruding from the part of the first main surface of the second submount and opposing the one end of the semiconductor laser is filled a resin having a refractive index of more than 1 so that the laser beam reflected by the reflection mirror and emitted from the one end of the semiconductor laser propagates through the resin and enters into the waveguide.

Further, this invention is characterized in that at least a part or entire surface of the semiconductor laser is covered with a resin.

Advantages of the Invention

With this invention as described above, the use of two submounts allows the semiconductor laser to be located near the magnetic head while securing a heat dissipation capability. The beam from the semiconductor laser can therefore be propagated to the optical waveguide with high efficiency. Because of the structure that minimizes the warping of the slider and allows for the use of a dimple, a good floating characteristic is assured. It is therefore possible to realize a thermally assisted magnetic recording head of a compact size capable of high-density, high-speed recording without its thickness becoming excessively large.

MODE FOR CARRYING OUT THE INVENTION

Figure 1:
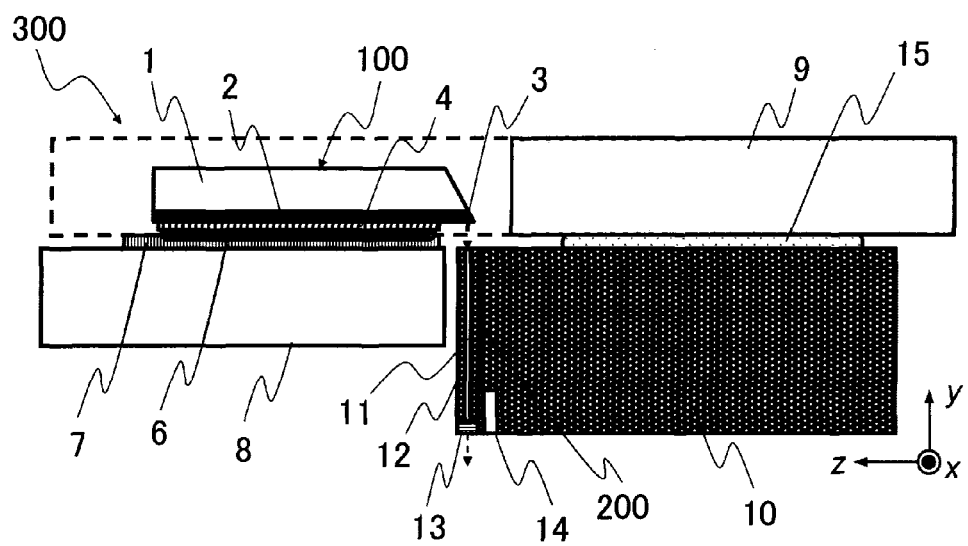
FIG. 1 is a cross-sectional view of a thermally assisted magnetic recording head according to embodiment 1 of the invention.

Modes of implementing the present invention will be described by referring to the following embodiments and their associated drawings.

In the following, some examples of the thermally assisted magnetic recording head implementing this invention will be described by referring to the accompanying drawings. Main components of the head required to accomplish the thermally assisted magnetic recording are a laser diode with a reflection mirror (also referred to as an LD), a slider having an optical waveguide, a near field generating device and a magnetic field generating device, and a submount used to secure heat dissipation and reliability of the LD.

The laser diode (LD) of the thermally assisted magnetic recording head according to this invention (also referred to as this construction) has a part or all of its one end surface formed with an inclined surface whose lower part expands in a direction that an oscillator extends. It is desired that the inclined surface be formed at an angle of 45° to the optical waveguide surface of the oscillator. The LD element becomes heated to high temperatures during operation and there is a close relation between temperature rise and longevity. So, it is preferable to connect the LD and the submount in a so-called junction-down structure in which an active layer of LD is put closer to the submount (the connecting surface with LD) than its substrate. In this construction, it is advised to use a AuSn solder with high heat conductivity in connecting the LD and the submount.

Should the heat produced by the thermally assisted magnetic recording head (particularly LD) fail to be dissipated satisfactorily from the slider, not only the life of the LD may get shortened but the slider may also be deformed before or after the operation of the LD. As the deformation of the slider increases, its floating characteristic with respect to the magnetic disk deteriorates, making a head crash caused by its contact with the magnetic disk likely. Taking these into consideration, the inventors of this invention have come up with a construction in which, for a longer life of the LD and for prevention of deformation of the slider, the LD and the slider are secured to separate jointing members (e.g., submounts) so that the heat produced in the LD is dissipated efficiently through the jointing members to the suspension without building up the heat in the slider. That is, the magnetic recording head according to this invention has a plurality of jointing members, one of which is securely mounted with the slider and another with the laser diode, with the jointing member with the laser diode further mounted through another joining member (e.g., the slider-mounting jointing member) to the suspension. In this construction, it is advised that a material of the submount be selected by considering heat conductivity, linear expansion coefficient, thickness, stiffness and workability of SiC, $Al_2O_3$, MN, Si, AlTiC ($Al_2O_3$—TiC) and the likes. As for thickness, it is preferably set in a range of 100 μm to 200 μm. Near one end surface of the slider there is provided an optical waveguide that passes through the slider in the direction of slider thickness. On the air bearing surface of the slider a near field generating device is provided. As a slider material, AlTiC ($Al_2O_3$—TiC) has conventionally been used. It is important that the constitutional members described above be secured with high precision using a joining material such as bonding agent and solder.

Embodiment 1

Figure 2:
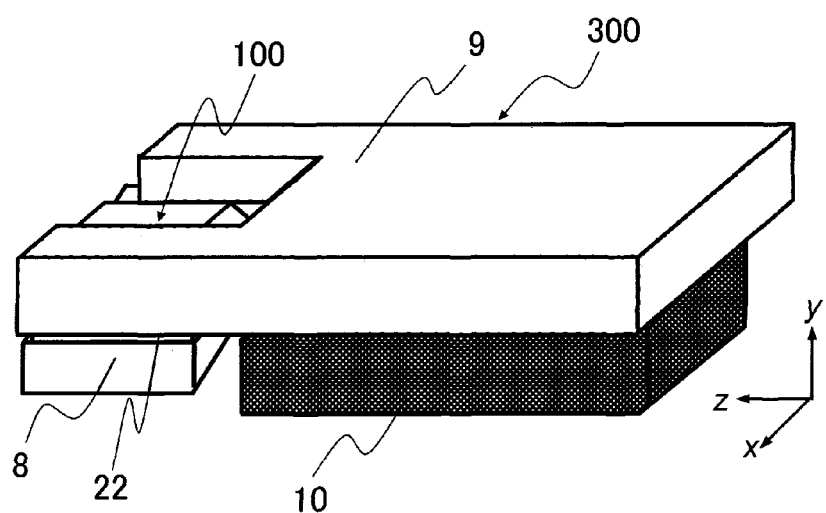
FIG. 2 is a perspective view of the thermally assisted magnetic recording head according to embodiment 1 of the invention.

FIG. 1 is a cross-sectional view of a thermally assisted magnetic recording head 300 of this embodiment cut along a rotation circumferential direction of a recording medium (magnetic disk) not shown. FIG. 2 is a perspective view of the thermally assisted magnetic recording head 300 shown in FIG. 1. In FIG. 1, FIG. 2 and other figures, a Cartesian coordinate system is shown for the understanding of a positional relation of the thermally assisted magnetic recording head 300 (or its part, e.g., slider 10) among these figures. In either of these figures, a z-axis represents the direction in which the recording medium advances relative to the magnetic head (direction of movement) and a y-axis represents the direction in which the magnetic head is secured to the slider. The direction of advance of the recording medium in the hard disk drive is also referred to as a rotational direction of the magnetic disk (a circumferential direction of the magnetic disk at rest). The slider 10 is formed with a magnetic field generating device 14 patterned in an x-y plane. The slider 10 is mounted to a suspension 25 described later so that the lower surface of the slider 10 in a x-z plane opposes the recording medium. Normally, the slider 10 is formed like a plate, with a pair of its main surfaces along the x-z plane set apart from each other in the y-axis direction. So, the y-axis is also called a slider thickness direction.

Figure 3:
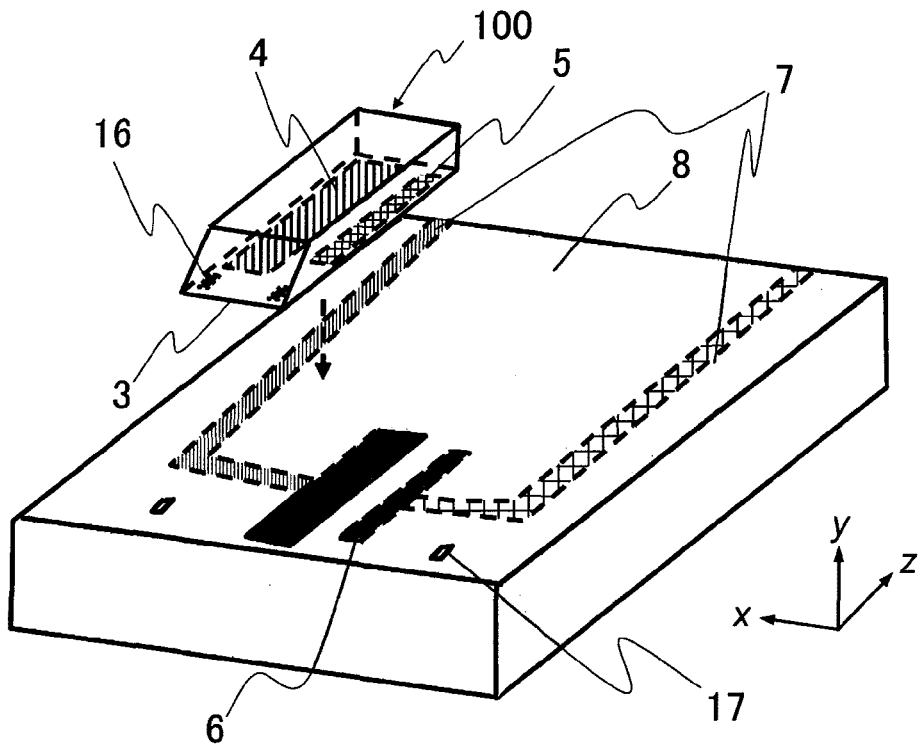
FIG. 3 is a schematic diagram showing a process of mounting an LD element monolithically integrated with a reflection mirror on a first submount in the thermally assisted magnetic recording head according to embodiment 1 of the invention.

As can be seen from FIG. 1 and FIG. 2, the thermally assisted magnetic recording head 300 has two submounts 8, 9, on one of which (referred to as a first submount) 8 is mounted a reflection mirror-attached laser diode (also referred to as an LD element) 100 and on the other (referred to a second submount) 9 is mounted the slider 10. The LD element 100 has monolithically integrated on a semiconductor substrate 1 of, for example, gallium arsenide (GaAs) an active layer (light emitting layer) 2 of hetero-epitaxially grown III-V semiconductor thin film and a reflection mirror 3 formed by patterning a thin film of dielectrics or the like. The LD element 100 is mounted on the upper surface (mounting surface) of the first submount 8 (parallel to the x-z plane), with the main surface of the LD element close to the active layer 2 facing the upper surface of the first submount 8. In a thermally assisted magnetic recording head 300 using a short wavelength laser, such as blue laser, an LD element 100 used comprises a sapphire or silicon carbide (SiC) substrate 1 instead of the semiconductor substrate and an active layer 2 of III-V nitride semiconductor thin film grown hetero-epitaxially on the main surface of the substrate 1. As shown in FIG. 3, the LD element 100 is securely mounted on the first submount 8, with a p-type electrode 4 and an n-type electrode 5 formed on its main surface near the active layer 2 soldered to an electrode 7 formed on the mounting surface of the first submount 8.

The second submount 9 is formed recessed (U-shaped) in the x-z plane and has a part of its undersurface (a bottom of the U-shaped portion), parallel to the x-z plane, mounted with the slider 10. Two portions extending in the z-axis direction from the part of the underside form a space in which to accommodate the LD element 100 (see FIG. 2). The mounting surface of the first submount 8 is formed wider than the "space" in the x-axis direction and its both ends are secured to the underside of the second submount 9 (the two portions described above) with a first bonding agent 22. At the end of the slider 10 where a magnetic field generating device 14 is formed, there is provided an optical waveguide 200, which has a near field generating device 13 at the end thereof. At its surface opposite the one formed with the near field generating device 13 and the magnetic field generating device 14, the slider 10 is secured to the "part" of the underside of the second submount 9 with a second bonding agent 15. When the slider 10 is secured to the second submount 9, the other end of the optical waveguide 200 is placed in the "space" surrounded by the underside of the recessed portion of the second submount 9 in which the optical waveguide 200 is optically coupled with the LD element 100 (reflection mirror 3).

The upper surface of the second submount 9 parallel to the x-z plane is mounted to the suspension at its portion opposite the "part" of the underside. With this construction, the heat generated by the LD element 100 is transmitted to the first submount 8 and the second submount 9 successively so that it is dissipated from the surfaces of these submounts during the process of transmission. This in turn prevents the first submount 8 from being overheated by the LD element 100, allowing the LD element 100 to be driven at a proper ambient temperature and securing its reliability. It is possible to fabricate the first submount 8 and the second submount 9 in the form of a printed circuit board and to make a positional alignment between the LD element 100 and the first submount 8 and between the first submount 8 and the second submount 9. This not only forms a signal path between the LD element 100 and the suspension but also establish a good optical coupling between the LD element 100 and the slider 10. One example procedure for assembling the magnetic recording head according to this invention, desirable in terms of deriving the aforementioned advantages, will be explained by referring to FIG. 3.

FIG. 3 is a perspective view showing the LD element 100 (a laser diode with a reflection mirror) and the first submount 8 on which the LD element is mounted. The LD element 100 is adjusted in its position on the upper surface of the first submount 8 (mounting surface parallel to the x-z plane) by using alignment markings 16 formed on the LD element and alignment markings 17 formed on the first submount 8, before being mounted on the mounting surface. The alignment in the oscillator direction (z-axis direction) of the LD element 100 is performed by using a light reflected from the end surface of the reflection mirror 3 integrated on the LD element and executing an image recognition of the end surface while taking into account the metallized structure of the electrodes 4, 5 of the LD element 100, the thickness of the connecting material (e.g., thin-film solder 6) and the angle of the reflection mirror 3. For example, for each image recognition executed on the end surface of the reflection mirror 3, the position of the LD element 100 on the mounting surface of the first submount 8 is corrected according to the recognition result and this process is continued until the "shifting amount" for the position correction of the LD element 100 decreases to such an extent that it can be neglected, at which time the LD element 100 can be suitably mounted on the mounting surface. For the alignment in the direction of width of the LD element 100 (x-axis direction), it is advised that the marking provided in a process of building the optical waveguide of the LD element 100 (including the active layer 2) into a mesa structure be used.

The thin-film solder 6 formed on the first submount 8 should preferably use AuSn from the standpoint of heat dissipation and it is advised that the solder be reflowed at temperatures more than 300° C. It is also advised that the p-type electrode 4 and the n-type electrode 5 of the LD element 100 of this embodiment be provided on the side facing the first submount 8. Where a plurality of electrodes 4, 5 with different functions that are formed on the same main surface are connected to the wiring 7 on a printed circuit board or the like with the solder 6, these electrodes 4, 5 may get connected to the solder 6, resulting in an electric short-circuit. To avoid such a problem, the wettability of the solder 6 with respect to the main surface and the pressure with which the electrodes 4, 5 are bonded to the wiring 7 should be taken into consideration to adjust intervals between solders 6 applied to the individual wirings 7. If there is a margin of several tens of μm in the direction of height of the magnetic head 300 (y-axis direction), the heat dissipation from the LD element 100 to the first submount 8 can be enhanced by forming the p-type electrode 4 over the entire area of the connecting surface (undersurface shown in the figure) and the n-type electrode 5 in other surface of the LD element 100 than the connecting surface (e.g., upper surface shown in the figure). Although it has been recommended that the connecting surface of the LD element 100 be covered with the p-type electrode 4 because the substrate 1 of the LD element 100 is often formed of an n-type semiconductor, an LD element 100 using a substrate 1 formed of a p-type semiconductor is recommended to have its connecting surface covered with the n-type electrode 5. The n-type electrode 5 (p-type electrode 4) formed on the surface of the LD element 100 other than the connecting surface is connected as by wire bonding to the wiring 7 formed on the first submount 8 but may be wire-bonded to a lead line formed on the second submount 9. By setting the p-type electrode 4 at a positive potential and the n-type electrode 5 at a negative potential, holes from the former and electrons from the latter are injected into the active layer 2, causing a laser oscillation.

Next, the first submount 8, after being applied with the first bonding agent 22 at both sides of its mounting surface, is mounted to the recessed portion of the second submount 9 (the "two portions" extending in the x-axis direction). The LD element 100 is enclosed by the recessed portion of the second submount 9, with one of its surfaces along the x-y plane and two surfaces along the y-z plane facing the side surfaces of the second submount 9. For the first bonding agent 22, it is advised to use a conductive bonding agent with high conductivity.

Then, for thoroughly hardening the first bonding agent 22, the first submount 8 on which the LD element 100 is mounted is baked, with the second submount 9 temporarily secured. In a hard disk drive (HDD), considering the heat resistance of the magnetic head, the baking temperature should be kept to around 100° C. as much as possible. It is therefore desired that a bonding agent that hardens at low temperatures be used as the first bonding agent 22. Next, a planar portion of the recessed second submount 9 (the "part" of the undersurface described above) is applied with the second bonding agent 15 and the slider 10 attached with the optical waveguide 200 is mounted on the second submount 9. The mounting of the slider 10 to the second submount 9 is done, in a manner similar to the positional alignment of the LD element 100 with the first submount 8 in the oscillator direction, preferably by image-recognizing the center of the core 11 of the optical waveguide 200 formed in the slider 10 or the marking provided during the process of forming the core 11 and correcting the position of the slider 10 relative to the second submount 9.

Hard disk drives of recent years have their slider 10 reduced in size, and particularly the femtoslider is thinnest among them at 230 μm (in the y-axis direction), with a floating distance (in y-axis direction) from the magnetic disk (recording medium) measuring only abut 10 nm. So, if the slider 10 should produce uneven warping on the order of several nm, the floating characteristic with respect to the magnetic disk degrades. To avoid such a warping of the slider 10, it is advised that a bonding agent to be used as the second bonding agent 15 have a low elastic modulus and a low hardness. The low-elastic-modulus, low-hardness bonding agent preferably has a property with an elastic modulus at room temperature of 100 MPa or lower and a Shore hardness A of 50 or less. While the second bonding agent 15 may use a conductive bonding agent with additional functions of hardening upon being subjected to either of ultraviolet rays and heat, it is also possible to separately apply the hot setting adhesive to the bonding surface and the ultraviolet-curing adhesive to the lateral side of the bonding surface. To prevent the second bonding agent 15 from spreading from the upper surface of the slider 10 onto other adjoining main surfaces (side surfaces) and covering the core 11 of the optical waveguide 200 or a portion that takes in the laser beam from the LD element 100, the upper surface of the slider 10 is preferably formed with a dam structure of plating material. As a result the applied film of the second bonding agent 15 is prevented from spreading more than necessary and its film thickness is kept almost uniform. Then, the second submount 9 is mounted with the slider 10 and baked again, thoroughly hardening the applied film of the second bonding agent 15.

In the magnetic head of this embodiment described above, considering the thickness of the jointing materials (solder 6 and bonding agent 15, 22) and the tolerance of the submounts 8, 9, the distance between the beam emitting portion of the LD element 100 (underside of the reflection mirror 3) and the beam entry portion of the optical waveguide 200 may be able to be reduced to 30 μm or less. Although the magnetic head of this embodiment has its thickness (in the y-axis direction) increase, when compared with the conventional magnetic head, by the thickness of the second submount 9 and the connecting material (bonding agent) 15, it can be fabricated compact. In this construction the LD element 100 and the optical waveguide 200 can be optically coupled by performing the alignment between the LD element 100 (reflection mirror 3) and the slider 10 (optical waveguide 200) only once, allowing the slider 10 in this state to be secured to the submount 9. As a result, the heat generated in the LD element 100 can be released through the two submounts 8, 9 successively to the slider 10 and the stainless steel (SUS) suspension 25, assuring the heat dissipating capability of the magnetic head itself.

The position alignment between the LD element 100 and the slider 10 is done according to the procedure of the so-called "passive alignment method," which involves using the LD element 100 or the alignment markings 16, 17 formed on the surface of the first submount 8 (x-z plane) to which the LD element 100 is secured and adjusting the alignment between them and the optical waveguide 200 (beam receiving end) of the slider 10 without oscillating the LD element 100. The alignment between the LD element 100 and the slider 10 based on the passive alignment method, however, has a problem that, where the alignment marking 16 cannot be formed on the LD element 100 that exhibits the mesa structure or where an aligner has a low precision in recognizing the alignment marking 16, the efficiency of optical coupling between the LD element 100 and the optical waveguide 200 of the slider 10 cannot be raised sufficiently high. The aligner has an accuracy error of ±2 μm in the recognition of the alignment marking 16, so there is a possibility that the beam emitting point that is located with reference to the alignment marking 16 may have been deviated by the amount of the accuracy error from the beginning.

To eliminate these uncertainties inherent in the alignment operation based on such a passive alignment method, a so-called "active alignment method" that aligns the positions of the LD element 100 and the slider 10 while operating the LD element 100 (i.e., oscillating the laser) is recommended to be adopted. In the process of mounting the LD element 100 on the first submount 8, the use of the active alignment method allows the accuracy with which the aligner recognizes the alignment markings 16, 17 to be considered not so important. The point where the active alignment method differs from the passive alignment method is that the active alignment method adjusts the position of the slider 10 formed with the optical waveguide 200 by a probe or the like while keeping the LD element 100 energized and search for the condition in which the intensity of light entering from the LD element 100 into the optical waveguide 200 is maximum. For example, as the position on the x-axis, y-axis and z-axis of at least one of the LD element 100 and the slider and the rotation angle from each of these three axes as a center are changed, the intensity of the beam entering the optical waveguide 200 changes up or down. While keeping the LD element 100 and the slider 10 in a positional relationship that makes this light intensity maximum, the slider 10 is secured to the submount 9 with a UV-cured adhesive. For the joining between the undersurface of the second submount 9 (recessed portion surface along the x-z plane) and the slider 10, an adhesive with low elastic modulus may be used, as with the preceding example in which the alignment is done by the passive alignment method. It is more desirable to use a UV adhesive with a small cure shrinkage. With an appropriate bonding agent 15 selected, the warping of the slider 10 can be suppressed, securing the slider 10 to the submount 9 with high precision. The mounting procedure based on the active alignment method is more effective than the passive alignment-based procedure in eliminating positional deviations found through image recognition between members to be adjusted and the alignment markings.

Figure 11A:
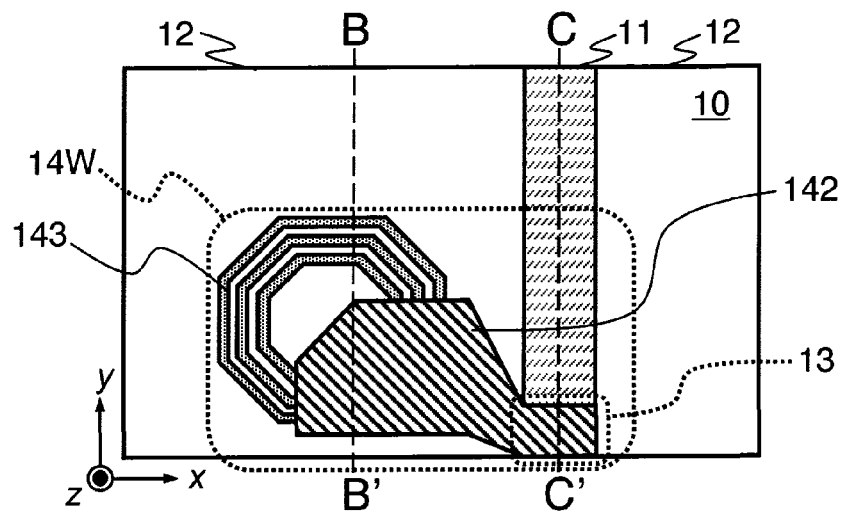
FIG. 11A is a schematic diagram showing an example of a slider of the thermally assisted magnetic recording head of the invention.
Figure 11B:
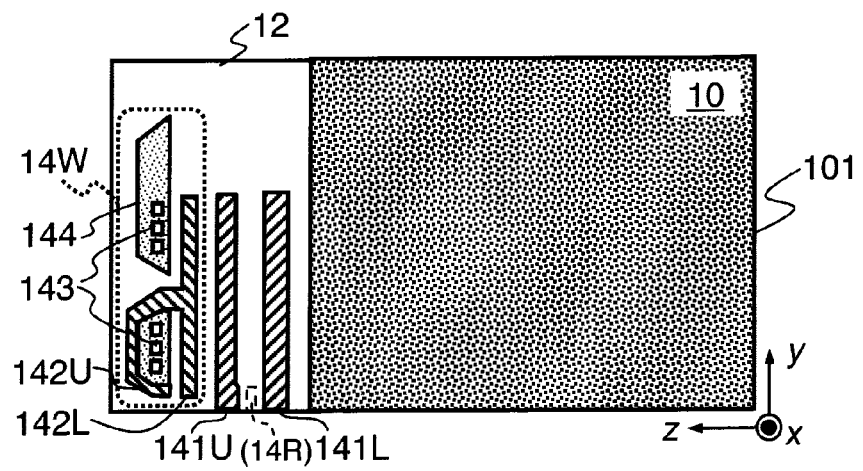
FIG. 11B is a schematic diagram showing an example of a slider of the thermally assisted magnetic recording head of the invention.
Figure 11C:
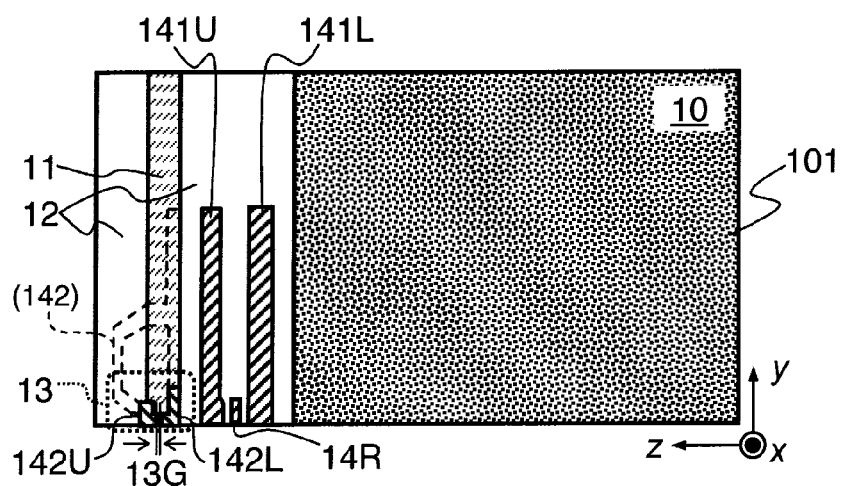
FIG. 11C is a schematic diagram showing an example of a slider of the thermally assisted magnetic recording head of the invention.

FIG. 11A to FIG. 11C show one example of the slider 10 with an optical waveguide 200. FIG. 11A represents an end face (x-y plane) of the slider opposing the first submount 8 mounting the LD element 100, with a near field generating device 13 and a magnetic field generating device 14W (referred to as a writing device), which writes information into a recording medium, both transparently shown to be formed near the end face. FIG. 11B represents a cross section of the slider 10 cut at the B-B' line of FIG. 11A along a y-z plane in a z-axis direction. FIG. 11C represents a cross section of the slider 10 cut at the C-C' line of FIG. 11A along the y-z plane in a z-axis direction. A recording medium (or track in the magnetic disk) moves relative to the slider 10 in a direction of "arrow" representing the z-axis. This "arrow" also indicates the direction of growth of thin films of the magnetic field generating device 14 and the near field generating device 13 formed on a substrate 101 of the slider 10.

On a main surface (x-y plane) of the substrate 101 formed of a nonmagnetic material, such as AlTiC ($Al_2O_3$—TiC), a magnetic field generating device 14R (referred to as a reading device) to read information from a recording medium and the writing device 14W, which also serves as the near field generating device 13, are successively formed and isolated from each other by dielectric films (insulating films) 11, 12. That is, the reading device 14R and the writing device 14W are successively placed over and oppose a track of the magnetic disk not shown. The track facing the writing device 14W receives a magnetic signal (write signal) and also is illuminated with a near field light generated by the near field generating device 13 placed by the side of the writing device 14W.

The reading device 14R may be constructed as a GMR (Giant Magneto Resistive) type or a TMR (Tunnel Magneto Resistive) type. The reading device 14R is formed by laminating, from the substrate 101 side, an antiferromagnetic layer of MnIr (manganese-iridium) or the like, a laminated ferri-structure formed by sandwiching a Ru (ruthenium) film with CoFe (cobalt-iron) films, an antioxidation layer formed of Cu (copper), and a current narrowing layer of CoFe and its oxide in that order. Formed over and below the reading device 14R are an upper shield layer 141U and a lower shield layer 141L, isolated from each other by a dielectric film (insulating film) 12. These shield layers 141U, 141L are formed of soft-magnetic materials, such as NiFe (nickel-iron), CoZrNb (cobolt-zirconium-niobium), CoFe, CoNiFe.

The writing device 14W has a yoke 142 made up of an upper magnetic pole 142U and a lower magnetic pole 142L and a coil 143 that generates a magnetic field (magnetic signal) between the poles 142U, 142L. The coil 143 is made of a nonmagnetic metal, such as Au (gold), Ag (silver), Cu, Cr (chromium), Al (aluminum), Ti (titanium), NiP (nickel-phosphorus), Mo (molybdenum), Pd (palladium) and Rh (rhodium), and embedded in an organic insulating film 144 of polyimide and polycarbonate for isolation from the yoke (magnetic pole) 142. The yoke 142 is formed of a soft magnetic material, as with the shield layers 141U, 141L described above. The yoke 142 of the magnetic head of this invention, however, is so fabricated as to produce a magnetic field in a gap separating the two magnetic poles 142U, 142L and also to function as the so-called plasmon probe that generates the near field light in proximity of the surface of the recording medium. The near field light is produced by a plasmon resonance that occurs as a visible light (laser) (with a wavelength range of between 380-780 nm) passes through a gap smaller than its wavelength. The near field light locally heats that part of the recording medium surface which is close to the gap. The magnetic poles 142U, 142L exposed from the underside (x-z plane) of the slider 10 shown in FIG. 11C are separated from each other in the z-axis direction by a gap (probe gap) 13G of 10-100 nm. If this gap 13G is formed of a member of a precious metal such as Au, Pt (platinum) and Ag, a plasmon resonance of a light entering this gap becomes more likely to occur. So, it is advised that the "portion that is applied with a signal from the coil 143 (e.g., a portion crossed by the line B-B' of FIG. 11A)" be formed of a soft magnetic material and that, at the "portion exposed from the dielectric layers 11, 12 to apply the magnetic signal and the near field light to the recording medium (e.g., a portion crossed by the line C-C' of FIG. 11A)," a precious metal film be formed over the soft magnetic material film to adjust the gap 130. This precious metal film may also be used as a jointing member between the upper magnetic pole 142U and the lower magnetic pole 142L, both making up the yoke 142.

From a track of magnetic disk (not shown) facing the underside of the slider 10 near the line C-C' of FIG. 11A, information recorded there is read by the reading device 14R. To this track new information is written by the writing device 14W. As to the other tracks (arranged radially parallel to the above track) of this magnetic disk, on the other hand, information recorded in these tracks is not read by the reading device 14R. Nor is new information written into these tracks by the writing device 14W. That is, at locations other than the neighborhood of the line C-C' of FIG. 11A, the reading device 14R is not formed, as shown at a dashed line frame (14R) in FIG. 11B. Further, as shown in the cross-section of FIG. 11B, the yoke 142 of the writing device 14W is located away from the underside (x-z plane) of the slider 10 facing the magnetic disk and the gap separating the two magnetic poles 142U, 142L of the yoke is wider than the probe gap 13G near the line C-C' of FIG. 11A. As a result, the slider 10 selectively transfers a magnetic signal to and from a particular track on the magnetic disk. Further, this embodiment selectively introduces a laser oscillated by the LD element 100 to the near field generating device 13 (probe gap 13G) formed near the line C-C' of FIG. 11A to increase the recording density of information on the magnetic disk. To this end, the slider 10 of this embodiment uses glass (SiO$_2$ or the like) instead of normally used alumina (Al$_2$O$_3$) as a material for the dielectric film (insulating film) 12 in which the magnetic field generating device 14 is embedded. Further, in the dielectric film a region 11 with high refractive index is formed extending from the probe gap 13G in the y-axis direction (along the line C-C'). In other words, if it is assumed that the high refractive index region 11 is "core," a region of lower refractive index surrounding it becomes a "clad", which traps light emitted from the LD element 100 in the core 11. In the following, a member with reference numeral 11 is referred to as a "core" and a member with reference numeral 12 as a "clad." The optical waveguide 200 described earlier is constructed of the core 11 and the clad 12 surrounding the core.

The core 11 and the clad 12 are both formed by depositing fine glass particles on the main surface of the substrate 101 or on a structure formed on that main surface and heating the deposited layer to high temperatures to make it transparent. The core 11 is highly doped with titanium oxide or germanium oxide, compared with the clad 12, raising its refractive index to a level higher than that of the clad 12. In FIG. 11A and FIG. 11C, the light emitted from the LD element 100 enters from the upper surface (x-z plane) of the slider 10 into the core 11 and propagates through the core 11 along the y-axis direction until it reaches the near field generating device 13 formed near the underside of the slider 10. After having reached the near field generating device 13, the light causes a plasmon resonance in the probe gap 13G formed in the device 13, whereby it is converted into a near field light which in turn locally heats the neighborhood of the surface (upper surface) of the magnetic disk.

The slider 10 with an optical waveguide 200 described in this embodiment can also be applied to magnetic heads 300 of other embodiments described later. It should also be noted that the magnetic heads 300 of this invention can also mount a slider other than the slider 10 described above by referring to FIG. 11.

Embodiment 2

Figure 4:
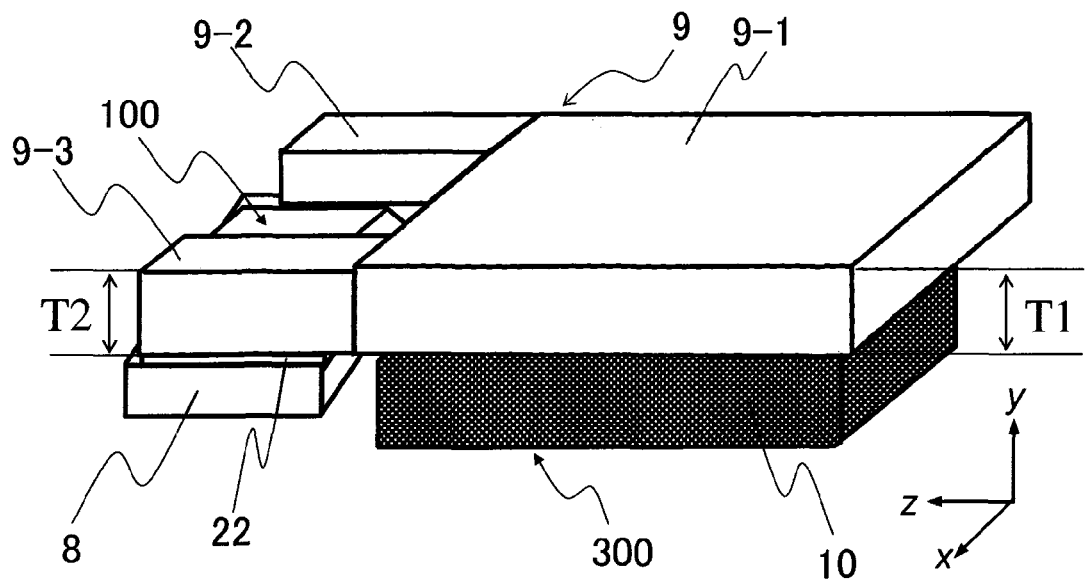
FIG. 4 is a perspective view of a thermally assisted magnetic recording head according to embodiment 2 of the invention.

FIG. 4 is a perspective view of another embodiment of this invention, schematically showing a magnetic head 300 that, instead of the so-called recessed type second submount 9 shown in embodiment 1, uses a second submount 9 composed of three flat (platelike) submounts 9-1, 9-2, 9-3 assembled into a recessed structure. In this embodiment that does not form the second submount 9 as one integral structure, there is an advantage that the manufacturing process of the second submount 9 does not require a special fabrication. In this structure, consideration needs to be taken of thickness tolerances of the submounts 9-1, 9-2, 9-3 and the thickness T1 of the submount 9-1 is preferably made larger than that T2 of the other submounts 9-2, 9-3. Since these submounts 9-1, 9-2, 9-3 are each formed with wiring, it is necessary to use a soldering material or a conductive adhesive in connecting the submount 9-1 with the submounts 9-2, 9-3.

Embodiment 3

Figure 5:
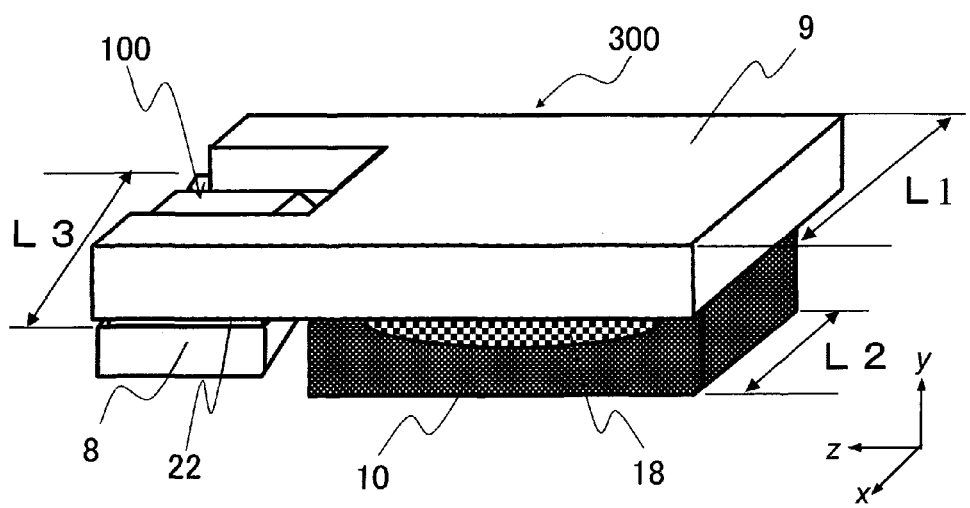
FIG. 5 is a perspective view of a thermally assisted magnetic recording head according to embodiment 3 of the invention.

FIG. 5 is a perspective view of a magnetic head 300 of still another embodiment of this invention. In this embodiment, although the integrally formed second submount 9 is used as with embodiment 1, its width (in the x-axis direction) L1 is set wider than the width L2 of the slider 10. Between the edges of the undersurface of the second submount 9 (two sides extending in the z-axis direction) and the sides of the slider 10 (y-z plane) is applied a third bonding agent (heat dissipating material) 18 with high heat conductivity.

In a hard disk drive, as the magnetic disk rotates, the slider 10 floats because of an air stream produced by the rotation. This results in the slider 10 being easily cooled depending on the velocity of the air stream. On the other hand, the adhesive with very high heat conductivity of around 20 W/mK is often mixed with metal particles such as silver, exhibiting a characteristic property of high elastic modulus or hardness. With such an adhesive having high heat conductivity used as the second bonding agent 15 to bond the undersurface of the second submount 9 and the upper surface of the slider 10, the slider 10 warps according to a temperature difference between the second submount 9 and the slider 10 that is cooled as the magnetic disk rotates. This makes it difficult to efficiently release from the slider 10 through the second bonding agent 15 the heat which has been transmitted from the LD element 100 through the first submount 8 to the second submount 9.

In this embodiment, therefore, while the undersurface of the second submount 9 and the upper surface of the slider 10 are bonded with a second bonding agent 15 with a small elastic modulus, those peripheral portions of the undersurface (x-z plane) of the second submount 9 which are not covered by the slider 10 are formed with a fillet of a third bonding agent 18 with high heat conductivity (e.g., 20 W/mK or higher). This is used as a heat dissipating material 18. The fillet of the third bonding agent 18 may be applied to the side surfaces (y-z plane) of the slider 10 adjoining the peripheral portions of the undersurface of the second submount 9. The heat of the second submount 9 therefore is released from the surface of the fillet (heat dissipating material) of the third bonding agent 18 attached to the second submount 9. Since the slider 10 is shaped such that its width (in x-axis direction) is shorter than its length (in z-axis direction), it is advised that the heat dissipating material (fillet of the third bonding agent) 18 be placed at both edges of the undersurface of the second submount 9 that sandwich the slider 10 in the width direction.

Further, if the width L1 of the second submount 9 is set larger than the width L3 of the first submount 8, the surface area in which the submounts 8, 9 are held in intimate contact increases, allowing the heat from the LD element 100 to escape from the heat dissipating material 18 more efficiently.

Embodiment 4

Figure 6:
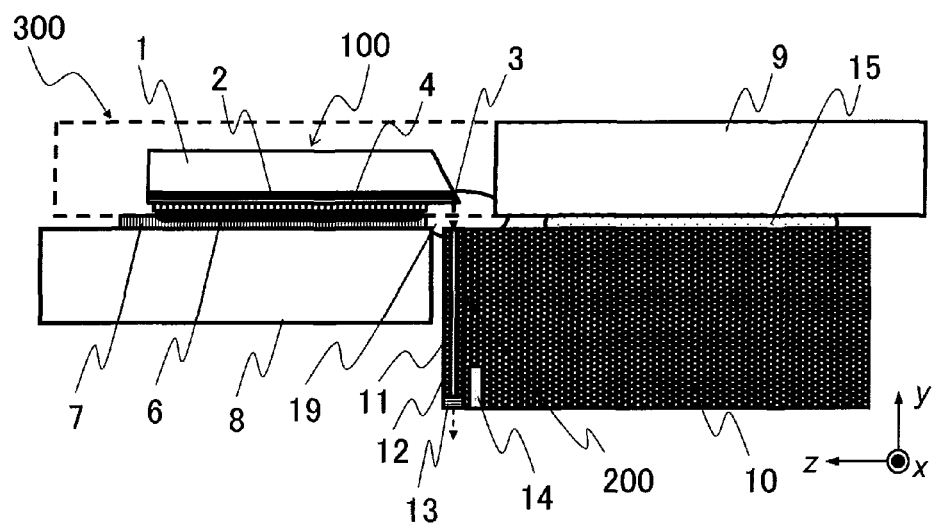
FIG. 6 is a cross-sectional view of a thermally assisted magnetic recording head according to embodiment 4 of the invention.

FIG. 6 is a cross-sectional view of a magnetic head 300 of a further embodiment of this invention, in which a so-called refractive index-matching resin 19 with its refractive index adjusted is shown to be filled between the laser beam emitting end (reflection mirror 3) of the LD element 100 and the slider 10 (upper end of the optical waveguide 200). This construction prevents the laser beam emitted from the LD element 100 from being reflected by the end surface of the optical waveguide 200 (core 11 and clad 12). For the matching resin 19 it is preferred to use a material having a refractive index close to that of the core 11 of the optical waveguide 200 (e.g., more than 1.0). It is desirable to use a resin that exhibits a refractive index of 1.5 or higher for the laser beam wavelength. For the refractive index-matching resin, it is also advised to use a resin whose degradation caused by the irradiation or absorption of a laser beam is minimized.

Embodiment 5

Figure 7:
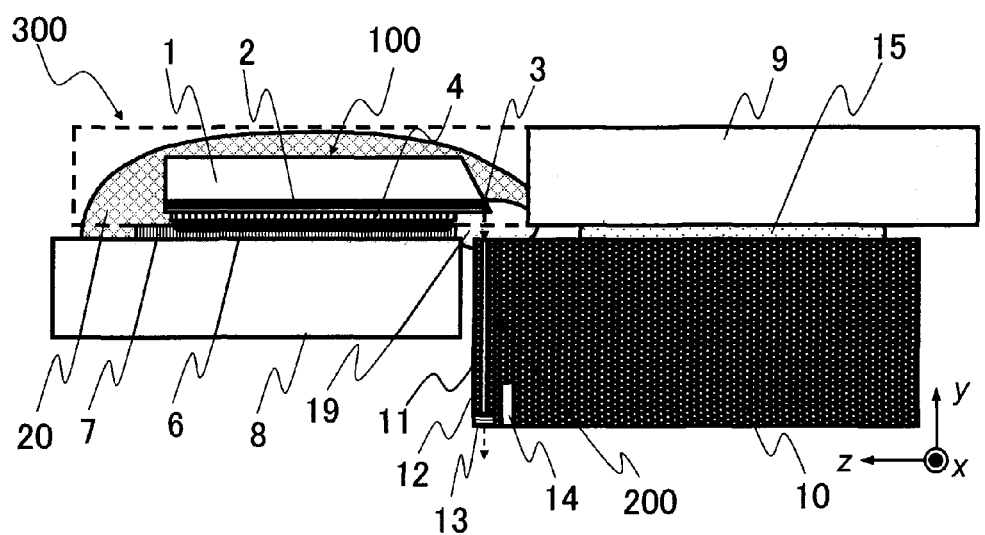
FIG. 7 is a cross-sectional view of a thermally assisted magnetic recording head according to embodiment 5 of the invention.

FIG. 7 is a cross-sectional view of a magnetic head 300 of a further embodiment of this invention. The magnetic head 300 of this embodiment is similar to the one in embodiment 4 but differs from it in that the entire LD element 100 (including other portions than the neighborhood of the light emitting portion) is covered with a potting resin 20.

In a hard disk drive (e.g., one in FIG. 10), the distance between the air bearing surface (ABS surface of the slider) and the magnetic disk is about 10 nm. So, if dirt of the order of several μm to several tens of μm should attach to the disk surface, the playback and recording of information to and from the magnetic disk is hindered to a significant extent. However, in a process of segmenting a semiconductor crystal, a parent material for the LD elements 100, according to cleavage into individual LD elements 100 of a desired size, dirt from the semiconductor crystal often attaches to the LD elements 100 and their neighbors (e.g., ABS surface). To cope with these problems, the magnetic head 300 of this embodiment covers single LD elements 100 with a resin 20 to prevent dust from falling from the LD elements onto the magnetic disk surface and adhering to it.

As shown in FIG. 7, after the gap between the mirror surface 3 of the LD element 100 and the optical waveguide 200 of the slider 10 is filled with the refractive index-matching resin 19, the potting resin 20 may be applied to the LD element 100, the upper surface of the first submount 8 on which the LD element 100 is mounted, and the upper surface of the slider 10 (upper end of the optical waveguide 200). Further, it is also possible to adjust the refractive index of the potting resin 20 and then fill it between the laser beam emitting end of the LD element 100 and the beam entry end of the optical waveguide 200 of the slider 10 as a replacement of the refractive index-matching resin 19.

Embodiment 6

This embodiment concerns the mounting of the magnetic head 300 on the suspension 25 in a hard disk drive according to this invention and more particularly a structure suited for releasing heat generated by the LD element 100 of the magnetic head 300. The magnetic head 300 described below has a structure discussed in one of embodiments 1 to 5.

Figure 8:
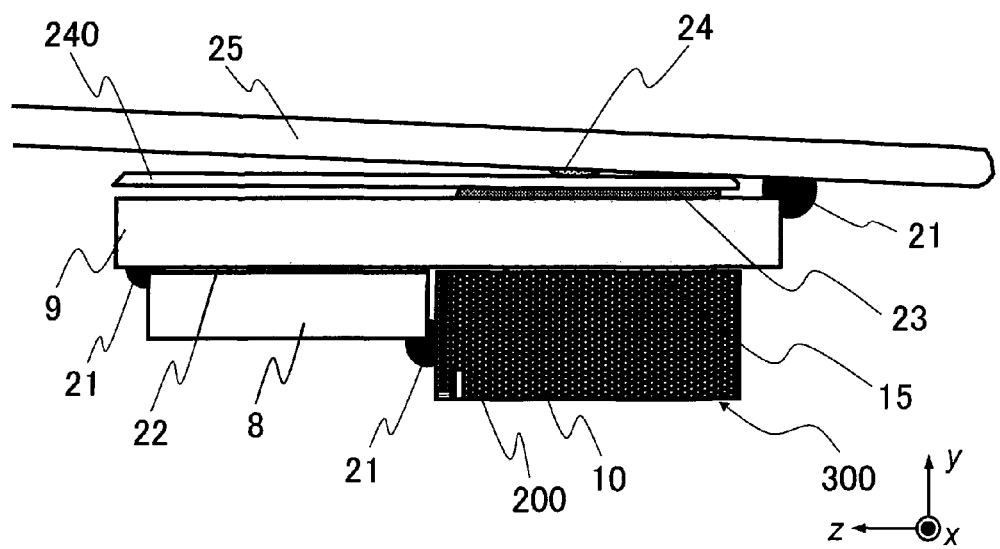
FIG. 8 is a schematic diagram showing a connection structure between a thermally assisted magnetic recording head and a suspension according to embodiment 6 of the invention.

FIG. 8 is a side view schematically showing the magnetic head 300 mounted to the suspension 25. A recording medium (magnetic disk) not shown that faces the undersurface (x-z plane) of the slider 10 moves in a direction of z-axis arrow. The LD element 100 mounted on the upper surface of the first submount 8 is concealed by the second submount 9 that is recessed (or U-shaped) in the x-z plane.

The magnetic head 300 is securely bonded through the second submount 9 to the suspension 25 that mechanically drives the head 300 over the surface of the recording medium. In more detail, the second submount 9 is bonded at its upper surface (opposite the underside to which the slider 10 is secured) to one end of a gimbal spring (a kind of leaf spring) 240 with a fourth bonding agent 23 and mounted at its upper surface peripheral portions (e.g., edges) to the underside of the suspension 25 with solder balls 21. The bonding positions of the gimbal spring 240 and the positions of the applied solder balls 21 on the upper surface of the recessed second submount 9 are preferably distributed over the bottom surface of the recessed portion. The suspension 25 is formed with a dimple 24 at its undersurface, and the gimbal spring 240 is kept in contact with the dimple 24 at its upper surface and tilts about the dimple 24 as a center relative to at least one of x-, y- and z-axis. This allows the undersurface of the slider 10 to tilt with respect to the undersurface of the suspension 25, so that should the upper surface of the magnetic disk (not shown), whose circumference extends in the z-axis direction, slightly deviate, the slider 10 and the magnetic disk are prevented from coming into contact with each other and causing damages to them. On the undersurface of the suspension 25 the dimple 24 is preferably arranged at a position where it is projected onto or near the center of the upper surface (x-z plane) of the slider 10. In the case of a thermally assisted magnetic recording head, the supply of electric power from the hard disk drive body to the magnetic field generating device 14 and the LD element 100 is made through a lead line provided on the suspension 25 and a flexible printed circuit board, not shown, jointed to the lead line.

In the mounting structure shown in FIG. 8, between the magnetic head 300 and the suspension 25 (hard disk drive body) there are formed a heat conduction path running through the fourth bonding agent 23, the gimbal spring 240 and the dimple 24 and another heat conduction path running through the solder balls 21. At least part of the heat generated in the LD element 100 is released through these paths out into the hard disk drive body (e.g., a case of the drive). The fourth bonding agent 23 securing the second submount 9 and the gimbal spring 240 needs only to be chosen considering mainly its heat dissipation capability, and an adhesive with high heat conductivity is preferably used.

For an efficient release from the magnetic head 300 of heat that is generated in the LD element 100, it is recommended to use a solder in connecting the first submount 8 to the second submount 9 (e.g., opening end of the upper surface of the U-shaped portion) and the first submount 8 to the slider 10 (on the optical waveguide 200 side). These solder connections are generally formed by supplying solder balls 21, such as those put between the magnetic head 300 (second submount 9) and the suspension 25, to the connecting positions and then applying a laser to the solder balls 21. Considering the presence of the LD element 100 near the connecting positions, it is desirable not to use flux for the solder joining. Making the solder joints between the suspension 25 and the second submount 9, between the second submount 9 and the first submount 8 and between the first submount 8 and the slider 10 allows for the supply of electricity to the magnetic field generating device 14 from the hard disk drive body through the second submount 9 and to the LD element 100 through the second submount 9 and the first submount 8.

Figure 9:
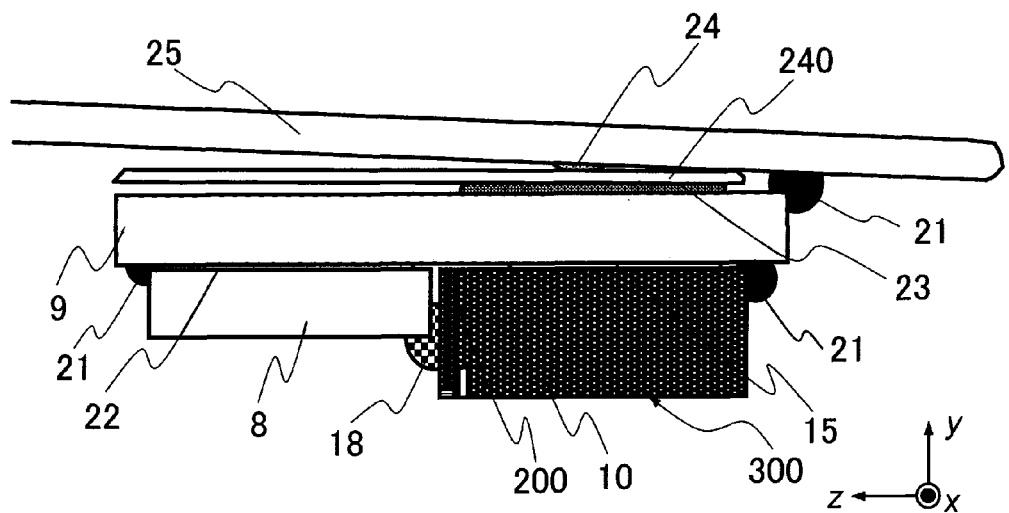
FIG. 9 is a schematic diagram showing another connection structure between the thermally assisted magnetic recording head and the suspension according to embodiment 6 of the invention.

Another structure in which the magnetic head 300 is mounted to the suspension 25 according to this invention is schematically shown in FIG. 9. In the mounting structure shown in FIG. 9, it is through the solder balls 21 that the connections are made between the suspension 25 and the second submount 9, between the second submount 9 and the first submount 8 and between the second submount 9 and the slider 10 (e.g., the surface of the substrate 101 opposite the device surface). Therefore, in the mounting structure of FIG. 9, electric signals and drive currents transmitted from the suspension 25 are directly supplied to the magnetic field generating device 14 or the like in the slider 10 through the solder balls 21 connecting the second submount 9 and the slider 10, without passing through the first submount 8 as in the mounting structure of FIG. 8. In the mounting structure of FIG. 9, since the need to electrically connect the slider 10 and the first submount 8 is obviated, the heat dissipating material 18 (e.g., the third bonding agent in embodiment 3 or its equivalent) can be filled between the slider 10 (end portion on the optical waveguide 200 side) and the first submount 8. Through this heat dissipating material 18 the heat of the LD element 100 (light emitting device such as a semiconductor laser) mounted on the first submount 8 is dissipated also to the slider 10. To prevent a warping of the second submount 9 caused by the jointing between the first submount 8 and the slider 10 through the heat dissipating material 18, the heat dissipating material 18 preferably uses a moisture-curing adhesive having a smaller "elastic modulus" than that of the second bonding agent 15 used to join the slider 10 and the second submount 9.

Embodiment 7

Figure 10:
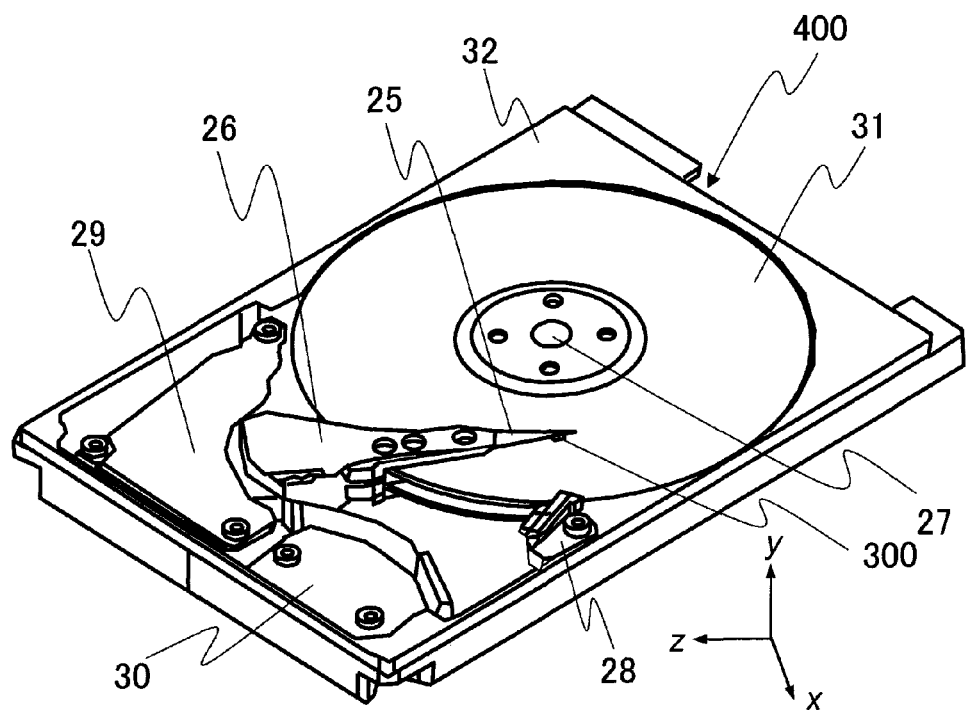
FIG. 10 is a schematic diagram showing a hard disk drive mounting a head of the invention.

FIG. 10 is a schematic view of a further embodiment of this invention showing a construction of a hard disk drive 400 that uses a thermally assisted magnetic recording head (simply referred to as a magnetic head) 300 of this invention. In a case 32 of the hard disk drive 400 is installed a magnetic disk (simply referred to as a disk) 31 as a recording medium that is driven at high speed by a spindle motor 27. At one end of the suspension 25 the magnetic head 300 of this invention is mounted, with the other end connected to an arm 26. The magnetic head 300 is shaped, for example, like the one in one of embodiment 1 to 6, but is not limited to them as long as it does not depart from the spirit of this invention.

The arm 26 is driven by a voice coil motor 29 to move the magnetic head 300 to a position over the rotating disk 31 where the recording is done. The Cartesian coordinate system shown has an x-axis extending from the rotating center of the disk 31 toward the magnetic head 300, a y-axis crossing the recording surface of the disk 31 (where tracks not shown are formed), and a z-axis extending through the thermally assisted magnetic recording head 300 tangentially to the rotation circumference of the disk 31. The voice coil motor 29 moves the magnetic head 300 along the x-z plane through the arm 26 and the suspension 25. A signal processing LSI 30 that processes read and write information on the recorded data is also installed in the case 32. A lamp 28 is an indicator that lights up while the magnetic head 300 records information into the disk 31. Information (electric signals) to be stored in the magnetic disk 31 and a drive current for the LD element 100 are controlled by the signal processing LSI and supplied to the magnetic head 300 through the flexible printed circuit board (not shown) installed in the suspension 25 and the arm 26.

While the above description has been made in connection with example embodiments, it is obvious to a person skilled in the art that the present invention is not limited to them and that various changes and modifications may be made without departing from the spirit of this invention and the scope of the appended claim.

INDUSTRIAL APPLICABILITY

The thermally assisted magnetic recording head according to this invention, though it directly mounts an LD element (laser diode), assures a sufficient heat dissipation to suppress a temperature rise in the magnetic head and a satisfactory floating characteristic with respect to the magnetic disk. Therefore, the LD element is optically coupled with high efficiency to the optical waveguide, which is located near and led to the magnetic head (recording element), so that a laser beam radiated from the LD element is introduced to a track of the magnetic disk with low loss. As a result, a thermally assisted magnetic recording head of a compact construction capable of recording information on a magnetic disk with high density at high speed can be realized.

DESCRIPTION OF REFERENCE NUMERALS

1: Semiconductor substrate
2: Active layer
3: Reflection mirror
4: p-type electrode of LD
5: n-type electrode of LD
6: Thin film solder
7: Electrode of first submount
8: First submount
9: Second submount
9-1: Third submount
9-2: Fourth submount
9-3: Fifth submount
10: Slider
11: Core
12: Clad 13: Near field generating device
14: Magnetic field generating device
15: Second bonding agent
16: Alignment marking for LD
17: Alignment marking for first submount
18: Second bonding agent (heat dissipating member)
19: Matching resin
20: Potting resin
21: Solder ball
22: First bonding agent
23: Fourth bonding agent
24: Dimple
25: Suspension
26: Arm
27: Spindle motor
28: Lamp
29: Voice coil motor
30: Signal processing LSI
31: Magnetic disk
32: Case
100: LD element
200: Optical waveguide
300: Thermally assisted magnetic head
400: Hard disk drive

The invention claimed is:

1. A thermally assisted magnetic recording head comprising:
   a semiconductor laser having a mirror at one end thereof in an oscillator direction, the mirror being adapted to reflect a laser beam in a direction crossing the oscillator direction;
   a slider having a pair of magnetic poles at one end thereof and a waveguide formed on the one end side, the waveguide being optically coupled to one end of the semiconductor laser;
   a first submount mounting the semiconductor laser and having a main surface extending in the oscillator direction of the semiconductor laser; and
   a second submount having on opposite sides thereof a first main surface and a second main surface and having the slider secured to a part of a first end side of the first main surface;
   wherein the other part of the first main surface on a second end side opposite the first end and a part of the second main surface opposing the other part extend in a pair of separate portions from the second end toward the part and are U-shaped;
   wherein the first submount is joined, on both sides of a portion of the main surface thereof where the semiconductor laser is mounted, to the pair of separate portions forming the other part of the first main surface of the second submount so that the semiconductor laser mounted on the main surface of the first submount is sandwiched between the pair of separate portions forming the U-shaped other part of the first main surface of the second submount;
   wherein the one end of the semiconductor laser and the waveguide formed in the slider are optically coupled in a space enclosed by the main surface of the first submount, the part of the first main surface of the second submount and the pair of separate portions forming the other part.

2. A thermally assisted magnetic recording head according to claim 1, wherein the second submount comprises at least three parts, the three parts being a first member forming the part of the first main surface, and a second member and a third member both forming the pair of separate portions of the other part of the first main surface.

3. A thermally assisted magnetic recording head according to claim 1, wherein the semiconductor laser and the waveguide are optically coupled by having opposed to each other the one end of the semiconductor laser, which protrudes from an end of the main surface of the first submount toward the part of the main surface of the second submount, and one end of the waveguide, which protrudes from the part of the main surface of the second submount toward the second end of the main surface.

4. A thermally assisted magnetic recording head according to claim 1, wherein, at the other end of the waveguide formed in the slider, which is opposite the one end thereof where the waveguide is optically coupled with the semiconductor laser, there is provided a near field generating device that generates a near field light from the laser beam transmitted through the waveguide.

5. A thermally assisted magnetic recording head according to claim 4, wherein the semiconductor laser has a semiconductor substrate and an active layer formed on one side of a main surface of the semiconductor substrate;
   wherein a p-type electrode and an n-type electrode for injecting current into the active layer are provided on the active layer side of the main surface of the semiconductor substrate.

6. A thermally assisted magnetic recording head according to claim 4, wherein the semiconductor laser is formed with an alignment marking in a process of forming the active layer in a mesa structure;
   wherein the slider is formed with an alignment marking in a process of forming a core of the waveguide at the one end thereof.

7. A thermally assisted magnetic recording head according to claim 4, wherein a width of the second submount crossing a direction extending from the first end of the first main surface to the second end is larger than a width of the slider crossing a longitudinal direction thereof.

8. A thermally assisted magnetic recording head according to claim 7, wherein the width of the second submount crossing the longitudinal direction thereof is larger than a width of the first submount crossing a longitudinal direction thereof.

9. A thermally assisted magnetic recording head according to claim 8, wherein at least a part of ends of the first main surface of the second submount and of the slider in contact with the first main surface of the second submount, a heat dissipating material or a fillet of a bonding agent with higher heat conductivity than that of a bonding agent used to bond the second submount and the slider is formed.

10. A thermally assisted magnetic recording head according to claim 3, wherein at least a part or all of the semiconductor laser is covered with a resin.

* * * * *